US011482769B2

(12) United States Patent
Sirure et al.

(10) Patent No.: US 11,482,769 B2
(45) Date of Patent: Oct. 25, 2022

(54) SENSOR BASED MONITORING SYSTEM FOR WIRELESS COMMUNICATION NETWORKS

(71) Applicant: Verveba Telecom LLC, Richardson, TX (US)

(72) Inventors: Gayatri Sirure, Richardson, TX (US); Manik Arora, Richardson, TX (US); Ameenuddin Habeeb, Richardson, TX (US)

(73) Assignee: Verveba Telecom LLC, Richardson, TX (US)

( * ) Notice: Subject to any disclaimer, the term of this patent is extended or adjusted under 35 U.S.C. 154(b) by 199 days.

(21) Appl. No.: 16/688,769

(22) Filed: Nov. 19, 2019

(65) Prior Publication Data

US 2021/0119320 A1 Apr. 22, 2021

Related U.S. Application Data

(60) Provisional application No. 62/916,656, filed on Oct. 17, 2019.

(51) Int. Cl.
| | | |
|---|---|---|
| *H01Q 1/24* | (2006.01) | |
| *H01Q 1/12* | (2006.01) | |
| *H01Q 1/18* | (2006.01) | |
| *H04Q 9/02* | (2006.01) | |
| *G01B 21/22* | (2006.01) | |

(52) U.S. Cl.
CPC ............ *H01Q 1/185* (2013.01); *G01B 21/22* (2013.01); *H01Q 1/1264* (2013.01); *H01Q 1/246* (2013.01); *H04Q 9/02* (2013.01); *G01B 2210/58* (2013.01); *H04Q 2209/826* (2013.01)

(58) Field of Classification Search
None
See application file for complete search history.

(56) References Cited

U.S. PATENT DOCUMENTS

| | | | |
|---|---|---|---|
| 8,471,780 B2 | 6/2013 | Dalmazzo | |
| 8,766,872 B2 * | 7/2014 | Dalmazzo | .............. H01Q 1/125 343/894 |
| 8,766,873 B2 | 7/2014 | Dalmazzo | |
| 9,711,842 B2 | 7/2017 | Dalmazzo | |
| 10,868,471 B2 * | 12/2020 | Fischer | .................. H01Q 1/002 |
| 2009/0141623 A1 * | 6/2009 | Jung | ...................... H01Q 25/00 455/562.1 |
| 2016/0020504 A1 * | 1/2016 | Michaelis | .............. H01Q 1/125 342/359 |
| 2018/0132205 A1 * | 5/2018 | Wattwood | ................. H01Q 3/02 |
| 2019/0268786 A1 * | 8/2019 | Fischer | ............. H02J 13/00024 |

* cited by examiner

*Primary Examiner* — Curtis A Kuntz
*Assistant Examiner* — Jerold B Murphy

(57) ABSTRACT

A sensor based monitoring system (SBMS) for a wireless communications network, a monitoring device for the SBMS, and a SBMS server are provided herein. In one example, the SBMS includes: (1) a monitoring device configured to collect antenna data of an antenna mounted on a communications structure of a wireless communications network and communicate the antenna data over a wireless network, and (2) a SBMS server configured to provide actionable intelligence based on the antenna data and system data of the wireless communications network from at least one other data source.

19 Claims, 7 Drawing Sheets

| | Azimuth | Initial Tilt | Final Tilt |
|---|---|---|---|
| Alpha | 20 | 6 | 5 |
| Beta | 120 | 6 | 2 |
| Gamma | 240 | 8 | 9 |

FIG. 5

SENSOR BASED MONITORING SYSTEM FOR WIRELESS COMMUNICATION NETWORKS

CROSS-REFERENCE TO RELATED APPLICATION

This application claims the benefit of U.S. Provisional Application Ser. No. 62/916,656, filed by Sirure, et al., on Oct. 17, 2019, entitled "SENSOR BASED MONITORING SYSTEM FOR WIRELESS COMMUNICATIONS NETWORKS," commonly assigned with this application and incorporated herein by reference in its entirety.

BACKGROUND

Wireless communications networks are becoming more prevalent throughout the world to provide the necessary capacity to meet the demand for bandwidth. Installing or expanding wireless networks, however, is more than just placing an antenna on communication towers. Maintaining the communication infrastructure after installation, including the antennas, is needed to ensure a reliable wireless communications network.

SUMMARY

In one aspect, the disclosure provides a sensor based monitoring system (SBMS) for a wireless communications network. In one example, the SBMS includes: (1) a monitoring device configured to collect antenna data of an antenna mounted on a communications structure of a wireless communications network and communicate the antenna data over a wireless network, and (2) a SBMS server configured to provide actionable intelligence based on the antenna data and system data of the wireless communications network from at least one other data source.

In another aspect, the disclosure provides a monitoring device for a SBMS. In one example, the monitoring device includes: (1) cellular connectivity circuitry configured to send and receive data via a cellular network, (2) sensing circuitry configured to sense antenna data of a mounted antenna, and (3) a processor configured to direct the sensing circuitry to sense the antenna data according to a profile, and control the cellular connectivity circuitry to send the antenna data to a SBMS server according to the profile.

In yet another aspect the disclosure provides SBMS server for a cellular network. In one example, the SBMS server includes: (1) data storage configured to store antenna data from antennas mounted on communications structures of the cellular network and system data of the cellular network, and (2) a processor configured to generate actionable intelligence for one or more of the communications structure based on an analysis of the antenna data and the system data.

BRIEF DESCRIPTION

Reference is now made to the following descriptions taken in conjunction with the accompanying drawings, in which:

FIG. 5 illustrates a Table that includes antenna data from the three antennas of the Alpha, Beta, and Gamma sectors that can be analyzed according to the principles disclosed herein;

DETAILED DESCRIPTION

Figure 1:
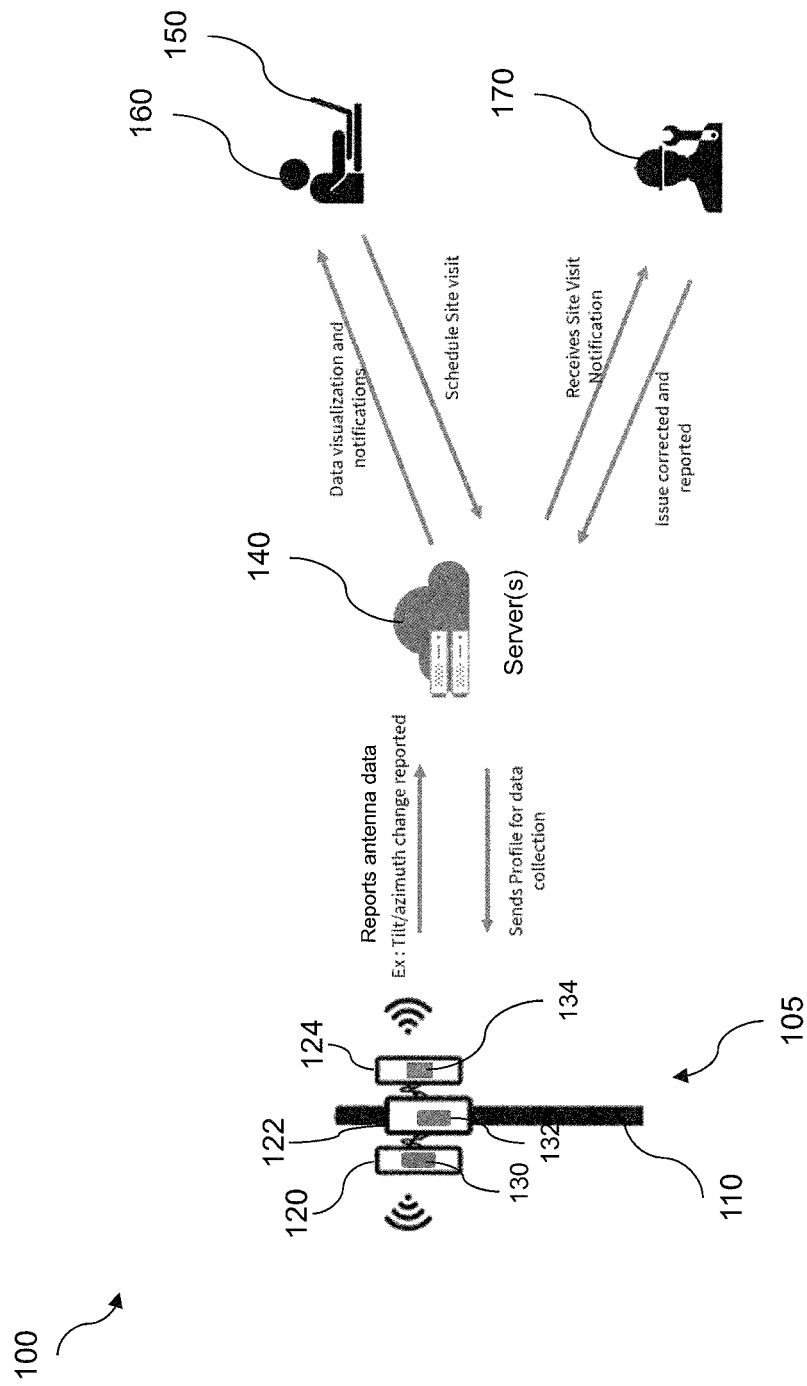
FIG. 1 illustrates a system diagram of an example of a SBMS constructed according to the principles of the disclosure.

As the development of communication devices and applications that execute on these devices increase, so does the need for the communication devices to be connected. As such, connectivity provides the backbone of the new technologies and innovations. The disclosure realizes that changes in antennas mounted on communications structures can affect the connectivity in a significant way. Accordingly, improvements for properly maintaining mounted antennas would be beneficial.

To assist in providing and maintaining wireless communications networks to provide connectivity, the disclosure provides a Sensor Based Monitoring System (SBMS) for the telecommunication industry. The disclosed solution changes how the elements (especially antennas) of wireless communications networks are managed and can be used to improve network performance. Accordingly, the solutions disclosed herein strengthen the connectivity backbone and improve the network to support the era of billions of connected devices. The solutions provide data driven procedures for maintaining connectivity that improve maintenance efficiency and also addresses the discrepancies that exist in the data of the central design databases for the communications structures.

The disclosed system can proactively detect problems and suggest remedies. The system can collect data from multiple data sources, analyze the data, and provide actionable intelligence for network improvement. The actionable intelligence is information resulting from the processing and analysis that can be acted on to remedy or prevent an adverse condition of the network. The information can be presented in the form of statements. The actionable intelligence can include the suggested remedies or remedial actions that can be taken to address existing and/or predicted problems. The system can also help prioritize site visits depending on the affected area or areas. The solutions provided herein can be used for various elements of wireless communications networks, including antennas irrespective of technology.

The disclosed system and solutions addresses multiple problems that affect network performance of wireless communications networks. Some of the problems are listed below.

1. The positional data of different elements of wireless communications networks listed in the central design database are often not accurate. For example the positional data of a mounted antenna, which includes mechanical tilt, roll, and azimuth, are listed in the central design database. Audits often reveal that the tilts, roll, and azimuths stored in the central design database differ from the actual installations in the field. Since engineers can use the stored positional data from the central design database to make future design and optimization decisions, incorrect data can result in inaccurate decisions for network improvement.

2. The communications structures that support the different elements can be affected by adverse weather, such as natural disasters like tornados and hurricanes. To ensure that the connectivity is established post calamity, tower crews typically visit the sites of the communications structures. Presently, prioritizing visits to the sites with maximum impact is difficult at best.

3. Problems at the sites can be due to various and different issues and can lead to an incomplete understanding of site issues. For example, if there are any changes in azimuth, roll, or mechanical tilt these might be connected with the site structural issues, e.g., foundation issues, instead of antenna mounting issues.

4. Though issues are noticed when there are changes at the sites, the availability of predictive insight is limited at best. As such, predictive alarms based on previous behavior would be beneficial.

To address at least these problems, as noted above the SBMS can capture data from multiple sources and generate actionable insights. For example:

1. The SBMS can give the delta between the data seen from the field and data from the central design database for positional data, such as mechanical tilt, roll, azimuth, and location of antennas. The SBMS can provide the delta regardless if the data in the central design database is accurate or not accurate.

2. A SBMS monitoring device can be used to communicate (transmit and receive) directly with a server location of the SBMS over a cellular communications network without employing a local wireless or wired network at the communications structure. As such, a receiving structure, station or device, for collecting antenna data at the communications structures having the monitoring devices is not needed. Additionally, a local wireless or wired network at the communications structure is not needed to communicate data between the SBMS monitoring device and the SBMS server.

3. Based on the weather data and historical data (past behavior on the sites, last maintenance done on the site, etc.), the SBMS can predict the high risk sites that may see changes.

4. Based on the data collected from multiple sources, the SBMS can give information about structural issues with the site.

FIG. 1 illustrates a system diagram of an example of a SBMS 100 constructed according to the principles of the disclosure. The SBMS 100 is illustrated in the environment of a communications network site 105 of a wireless communications network. The communications network site 105 includes a communications structure 110 and antennas 120, 122, 124, mounted on the communications structure 110. The SBMS 100 includes a different monitoring device 130, 132, and 134, associated with each of the antennas 120, 122, 124, and a server 140. The wireless communications network can include additional sites similar to site 105 that has antennas and monitoring devices that communicate with the server 140 as do the monitoring devices 130, 132, 134.

The communications structure 110 can be a cellular structure that includes electronic communications equipment along with the antennas 120, 122, 124. For example, the communications structure 110 can be a conventional cell site such as a lattice tower, a monopole tower, a guyed tower, a stealth tower, a water tower, or a rooftop. The antennas 120, 122, 124, can be mounted on the communications structure 110 via conventional mounting hardware used in the industry. The antennas 120, 122, 124, and associated communications equipment (not shown) can be configured for multiple existing or future cellular standards, such as, Global System for Mobile Communications (GSM), Wideband Code Division Multiple Access (WCDMA), and Long Term Evolution (LTE), of various wireless technology generations, such as, 2G, 3G, 4G and 5G. Within each cellular standard, the communications structure 110 can be used to communicate on multiple bands over different channels, wherein each of the channels corresponds to a particular carrier. For example, the antennas 120, 122, 124, and communications equipment can be used to provide 4G wireless communication according to the LTE standard over two frequency bands that each has three communication channels. The antennas 120, 122, 124, can be used to cover different sectors for communication. The sector sizes can vary. In some examples, the sectors can each be 120 degrees to provide 360 degree coverage around the communications structure.

The monitoring devices 130, 132, 134, are configured to collect antenna data from each of the respective antennas 120, 122, 124, and wirelessly communicate the antenna data to the server 140. The antenna data includes RF parameters from an antenna, positional parameters of the antenna, and location data of the site where the antenna is mounted. Each of the monitoring devices 130, 132, 134, is dedicated to collecting and reporting antenna data from a single antenna. The monitoring devices 130, 132, 134, can wirelessly communicate the antenna data over a cellular communications system, such as the one that includes the respective antennas 120, 122, 124. Antenna 120 and monitoring device 130 will be used as representatives for the antennas 120, 122, 124, and the monitoring devices 130, 132, 134, in the below discussion.

Monitoring device 130 includes the necessary hardware, software, or combination thereof for collecting the antenna data from antenna 120 and sending the antenna data to the server 140. Accordingly, the monitoring device 130 can be embedded with sensors, memory having a series of operating instructions stored thereon, cellular network circuitry for connectivity, and other necessary electronics that enable the monitoring device 130 to collect and exchange the antenna data from antenna 120. The series of operating instructions can correspond to an algorithm or algorithms that direct the operation of the monitoring device 130. The monitoring device 130 can be a sealed device. As such, the monitoring device 130 can include a protective case, in which the electronics are included therein. In some examples, the protective case can be permanently sealed. In other examples, the protective case can have at least one removable piece or section that can allow maintenance, such as battery replacement. The different sections can be mechanically coupled together and a gasket can be employed for weatherproofing. The monitoring device 130 can be an Internet of Things (IoT) device.

The monitoring device 130 is placed in the vicinity (on or near, i.e., proximate) of antenna 120. The monitoring device 130 can be attached to the antenna 120 by various means commonly used in the industry. In FIG. 1, a single monitoring device 130 is shown on antenna 120. In other examples, multiple monitoring devices can be proximate the antenna 120 and used for monitoring the antenna 120. As such, antenna 120 can include one or more monitoring devices. Monitoring device 130 includes at least one sensor that is configured (i.e., designed and constructed) to determine positional data of an antenna. Positional data of an antenna includes the physical parameters, or at least one of the physical parameters, indicating the alignment of a directional antenna on a communications structure, such as antenna 120 on communications structure 110. Positional data can include the azimuth, mechanical tilt, and roll of an antenna installation. The azimuth is the direction with respect to due north in which the antenna faces. The mechanical tilt, sometimes referred to as downward tilt, is the angle in which the antenna is inclined with respect to the horizontal in the plane of the azimuth. The roll, sometimes referred to as skew, is the vertical alignment of the antenna with respect to the horizontal.

The monitoring device 130 collects antenna data from the antenna 120 and sends the antenna data to the server 140. In some applications, a single server can be employed. In other applications, more than one server can be used as illustrated in FIG. 1. As such, the functionality of the server 140 can be distributed over multiple types of servers. The servers can be located at different locations. For example, one server can be employed to receive and store data from the monitoring devices and data from other sources, also. A second server can then include the logic, algorithms, etc., to perform the analysis of the data. As such, one server can be better configured for collecting and storing data and another server (s) can be more directed for programming to perform the analysis disclosed herein. The server 140 (or servers) can be a cloud server (or servers).

The server 140 is configured to receive the antenna data, analyze the antenna data, correlate the antenna data with system data from one or more data sources, generate insights from the analysis and correlation, and provide actionable intelligence, such as determining when a remedial action is needed and suggesting a remedial action or actions. The server 140 can provide a visual interface to report the results of the analysis, correlation, antenna data, etc. For example, the visual interface can be used to report the status of deployed sensors of monitoring devices along with alarms and notifications. The visual interface can provide the results via a dashboard. The results can also be provided via an application and tasks can be assigned to specific users. The visual interface can also include a graphical user interface (GUI). A user can view the results and schedule site visits in response. The user can schedule a site visit by contacting a crew member without employing the server 140. The server 140 can also be used to contact a crew member to perform the site visit and maintenance if needed. The server 140 can contact the crew member or crew automatically in some examples based on the results. In some examples, the crew member can be the user reviewing the results. Updated information can be provided back to the server 140 after a crew visit. The server 140 can provide the visual interface via another computing device, such as computing device 150 in FIG. 1. As illustrated, the computing device 150 can be a laptop. The server 140 can provide the visual interface to multiple computing devices. In some examples, the server 140 can simultaneously provide the visual interface to multiple computing devices. In FIG. 1, a user 160 and a crew member 170 are also shown.

Figure 2:
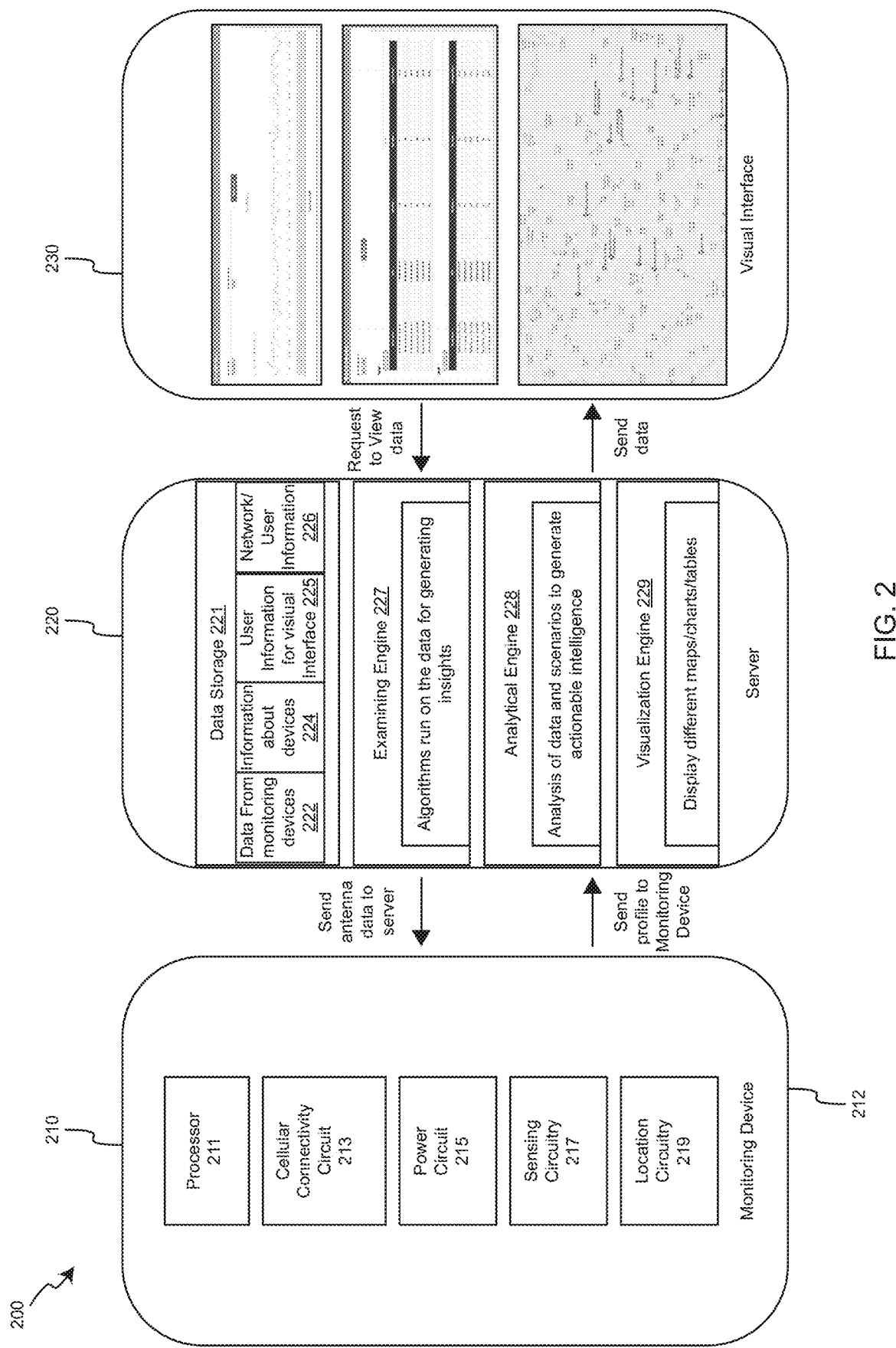
FIG. 2 illustrates a block diagram of an example of a SBMS constructed according to the principles of the disclosure.

FIG. 2 illustrates a diagram of an example of a SBMS 200 constructed according to the principles of the disclosure. Unlike some conventional monitoring systems, the SBMS 200 does more than just gather measurements from elements of a wireless communications network. Instead, the SBMS 200 considers data from multiple sources and generates actionable intelligence based on the data from the multiple sources. The SBMS 200 includes a monitoring device 210, a server 220, and a visual interface 230. With respect to FIG. 1, the monitoring devices 130, 132, 134, can be configured as the monitoring device 210, and the server 140 can be configured as the server 220. Additionally, the visual interface 230 provides an example of the visual interface discussed with respect to FIG. 1.

The monitoring device 210 is configured to collect antenna data of an antenna mounted on a communications structure of a wireless communications network and communicate the antenna data over a wireless network. As discussed herein with respect to FIG. 2, the wireless network is a cellular network. The monitoring device 210 is placed proximate to the antenna for collecting the antenna data. The location of or positioning of the monitoring device 210 with respect to the antenna can vary depending on, for example, the antenna type. For example, the monitoring device 210 can be positioned on the back panel of an antenna employing an adhesive or can be mounted on the side employing a bracket.

The monitoring device 210 includes electronic circuitry to perform the collection and communication of the antenna data, including a processor 211, cellular connectivity circuitry 213, a power circuit 215, sensing circuitry 217, and location circuitry 219. The electronic components can be coupled together via conventional connectors, such as wires, buses, traces, etc. In some examples, the components, or at least some of the components can be integrated on a printed circuit board.

All of the electronic components of the monitoring device 210 are located within a sealed, protective case 212 to protect the electronics included therein. For example, the monitoring device 210 does not have switches, buttons, screens, or any other external interface integrated with an exterior surface of the monitoring device 210. The case 212 can be constructed of a rigid plastic, polycarbonates, or other similar materials that allow wireless communication for the sensors and communication circuitry included in the monitoring device 210. As noted above, the monitoring device 210 can be an IoT device.

The processor 211 is configured to direct operation of the monitoring device. As such, the processor 211 can be configured to coordinate the collection and communication of antenna data via the sensing circuitry 217, the location circuitry 219, and the cellular connectivity circuitry 213. The processor 211 can direct the collection of antenna data according to a profile or profiles provided by the server 220. The processor 211 can be a microprocessor.

The cellular connectivity circuitry 213 is configured to communicate data with the server 220 via a cellular communications network. Accordingly, the cellular connectivity circuitry 213 can employ the cellular communications network of the antenna to communicate with the server 220. The type of cellular connectivity circuitry 213 can vary depending on the particular carrier being used. The cellular connectivity circuitry 213 can be a cellular low power chip used for connectivity over a cellular protocol. For example, the cellular connectivity circuitry 213 can be for a LTE-M/NB-IoT or other protocols for cellular communication. The cellular connectivity circuitry 213 can also provide location data and RF parameters.

Accordingly, the cellular connectivity circuitry 213 allows the monitoring device 210 to communicate data with the server 140 without gathering the data locally at the communications structure. Instead, the monitoring device 210 can send the data collected (such as according to a profile) to the server 220 and receive information from the server 220 without a local wireless or wired network at the communications structure.

The power circuit 215 is configured to provide power for the monitoring device 210. The power circuit 215 includes a power source, such as a battery, and corresponding circuitry configured to provide power for operating the monitoring device 210. The battery can be, for example, a 10,000 mAH Li-ion Polymer rechargeable battery available from NuEnergy Storage Technologies. Instead of a battery, the power source can be wind, solar, vibration, etc. In one example, the physical dimensions of the monitoring device 210 are, or are approximately 5"×2.6"×2".

The monitoring device 210 is configured to collect antenna data as per a profile received from the server 220. The profile can include the data type (or types) and measurement conditions. As such, the profile can include a data type paired with a measurement parameter or parameters. The measurement parameters can vary for each of the different data types, location of communications structure, historical data, or a combination of these and/or other factors. The measurement parameters can also be adjusted during monitoring based on, for example, at least some of the above factors. The measurement parameters can be adjusted automatically via a learning system of the SBMS 200 or manually by a user. The measurement parameters can include a condition and a set time for obtaining measurements. For example, the profile can be {Mechanical Tilt (1 degree, 15 minutes), Azimuth (5 degrees, 15 minutes), RF parameters (Quality, 1 Day), location (5 m, 15 minutes)}. Regarding mechanical tilt, the device will send data if there is a mechanical tilt change that is greater than 1 degree, and if there is no change, data will be sent every 15 minutes. For azimuth, azimuth changes greater than 5 degrees will be sent, and if there is no change, data will be sent every 15 minutes. Additionally, RF parameters for quality, such as RSRQ and SINR in LTE, will be sent every 1 day. Location changes greater than 5 meters in any direction will also be sent, or every 15 minutes if there are no such location changes. Each of the measurement conditions for the data types and the data type itself are configurable for at least the reasons noted above. For example, when to obtain an RF parameter and the type of quality parameters to monitor are configurable.

In order to collect the above information, the monitoring device 210 includes sensing circuitry 217. The sensing circuitry 217 can include one or more sensors. An example of a sensor that can be used for collecting positional data is a BN0055 available from Bosch Sensortec GmbH of Germany. In some examples, the sensing circuitry 217 can include multiple sensors for obtaining positional data. As such, a sensor that is directed to a single type of measurement can be used in order to provide, for example, higher accuracy. A wake-up sensor can also be used to wake-up the monitoring device 210 when needed to operate (and thus save power). Thus, the wake-up sensor can be used to power-up the device according to the profile. The wake-up sensor can be used according to the profile and can also be used for provisioning as discussed in method 700 of FIG. 7. An example of a wake-up sensor is a LIS3DH from STMicroelectronics of Switzerland.

The sensing circuitry 217 is configured to gather or obtain positional data about the antenna. The sensing circuitry 217 can include multiple sensors and, depending on the type of data to obtain, different types of sensors. The type of data to obtain can be based on the profile from the server 220. For example, for azimuth and mechanical tilt measurements—the sensor may have any of the standard azimuth/tilt measuring components including magnetometer, gyroscope, accelerometer, etc. For waking up the monitoring device based on movement, an accelerometer can be used. Other sensors in addition to those for mechanical tilt, roll, and azimuth can include data sensors that capture RF parameters, battery health and percentage, and location. The RF parameters can include cell ID, reference signal received power (RSRP), reference signal received quality (RSRQ), signal to noise ratio (SINR), or other RF parameters associated with an antenna. The location circuitry 219 can determine the location parameters that can include latitude, longitude, and altitude of a mounted antenna being monitored. The location parameters can correspond to network site, such as communications network site 105 of FIG. 1. The location circuitry 219 can be Global Positioning System (GPS) circuitry.

The server 220 has processing capability configured to perform the below functionalities and can be located in various locations in which the monitoring device 210 can communicate via the cellular communications network. The server 220 can be, for example, a cloud server (e.g., an Amazon Web Services Server) or server hosted at any facility.

The server 220 is a computing device having data storage (e.g., memory), a processor, and an interface for receiving and transmitting data. The server 220 can include conventional components or hardware typically included on a server that is configured to communicate via a communications network such as the Internet. The processor or processors of the server include hardware, software or a combination thereof to provide the necessary functionality of a server, such as a conventional server. In addition, the server is configured to perform the functionality disclosed herein. The server can include additional components that are typically included in a server, such as an interface (not shown). The interface can be a conventional interface typical to a server connected to the Internet or other communications networks. The interface can be configured to receive data from the monitoring device 210 and data from the other data sources disclosed herein. The interface can also be configured to send a visual interface to a computing device and receive inputs via the visual interface. As such, the interface includes the necessary ports and circuitry to transmit and receive types of data and information over various communication mediums.

The server 220 is responsible for data storage, running algorithms, receiving data from multiple sources, and hosting a visual interface, such as a dashboard and computer application. The server 220 represents one or more servers that can be co-located, such as in a same facility, or distributed over multiple facilities. Accordingly, the server 220 can be located at various locations irrespective of where the monitoring device 210 is placed. The server 220 provides various functions including data storage, processing, analysis, and data visualization. As illustrated in FIG. 2, the server 220 can include data storage 222, examining engine 227, analytical engine 228, and visualization engine 229. The various engines and data storage can be within a single server or distributed over multiple servers. Additionally, the examining engine 227, analytical engine 228, and visualization engine 229 represent functionality that can be performed by one or multiple processors operating according to operating instructions.

The data storage 222 can be a memory or multiple types of memory configured to store data. The server 220 can receive the data from multiple sources and store the data in the data storage 222. The data can be, for example, manually uploaded to the server 220 or the data can be received via an application program interface (API). The stored data can be used for analysis and/or for providing the visual interface 230. For example, the data storage 221 can be configured to store data from monitoring devices 222, information about the monitoring devices 224, user information for the visual interface 225, and network/user information 226. Different memory sections of the data storage 221 can be designated for storing the different types of data. As such, the antenna data from the monitoring device 210 can be stored with other antenna data from other monitoring devices in a memory section for data from monitoring devices 222. The antenna data can include RF Parameters (for example RSRP, SINR, RSRQ), positional data including the physical parameters of mechanical tilt, azimuth, and roll, and location data, such as latitude, longitude, mounting height, and/or altitude.

Data for the information about the monitoring devices 224 can include identifying information about each of the different monitoring devices, such as serial numbers, and where each of the particular monitoring devices are being deployed. For example, the data can include serials numbers paired with antenna identifying information, such as the serial number of the antenna and/or a description of the installed antenna. The description can include where the antenna is installed, how long it has been installed, carrier information, sector size, etc.

Date for the user information for the visual interface 225 includes access information for users. For example, this data can include user names, passwords, level of access, device information for receiving the visual interface, etc. The visualization engine 229 can use data from the user information for the visual interface 225 to control access and distribution of the visual interface. For example, some users may not have access all information that can be provided through the visual interface.

Figure 3:
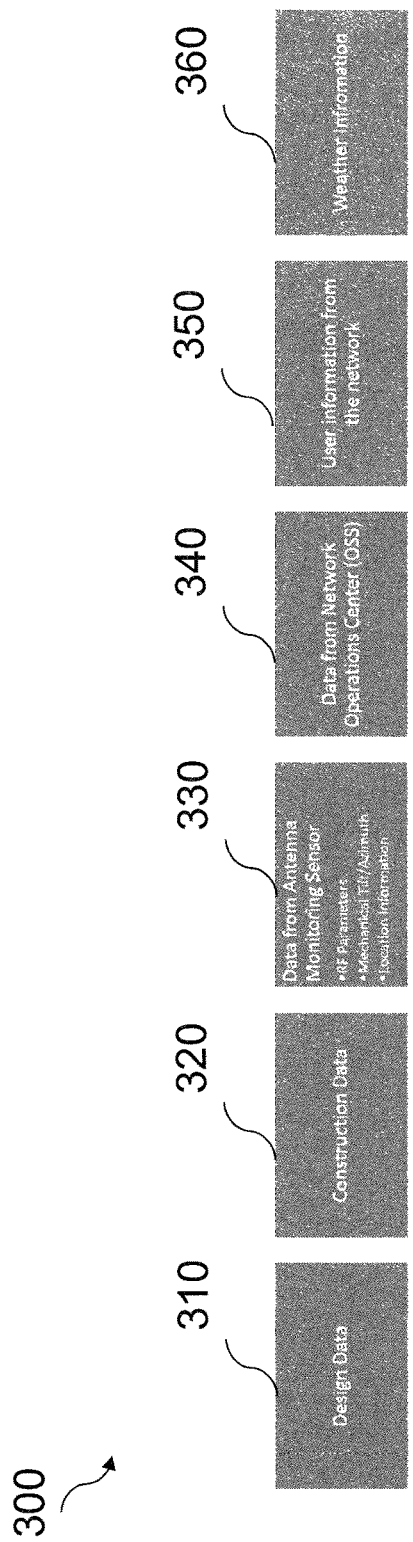
FIG. 3 illustrates an example of the various data sources that can provide data to analyze according to the principles of the disclosure.

The network/user information 226 can represent data from data sources that include design data that is network design data. For example, the network/user information 226 can store data, collectively referred to as system data, obtained from data sources that include design data, construction data, data from Network Operations Center (NOC), user information from the network, and weather information. FIG. 3 provides additional information regarding the data sources.

The data storage 222 can also be configured to store the series of operating instructions that direct the operation of a processor when executed to perform the procedures of functions described herein, such as those of the examining engine 227, the analytical engine 228, and the visualization engine 229. The data storage 222 can be configured as a conventional memory that stores code corresponding to the algorithms that provide the disclosed functions of the examining engine 227, the analytical engine 228, and the visualization engine 229.

The examining engine 227 and the analytical engine 228 are configured to process and analyze the received data based on the algorithms and generate actionable intelligence. The examining engine 227 includes logic to process at least some of the data from the data storage 221 and generate insights. The insights can include possible problems, trends, abnormalities, etc., indicated by the data. The analytical engine 228 analyzes at least some of the data from the data storage 221 and provides the actionable intelligence, such as suggested responses, based on the logic analysis of the examining engine 227.

The generated insights and analysis from the examining engine 227 and the analytical engine 228 can include the following individually and in a combination:
  Determine the effect of the change in physical parameters of the antenna on the network in terms of
    Capacity Impact: Number of supported users based on user traffic information from different and/or multiple sources, such as the OSS
    Coverage Impact: Based on the location of user served by that antenna
    Quality Impact: Based on quality parameters—like call drops, accessibility, retainability, SINR values, etc.
  Analyzing physical health of the tower based on sensor measurements
    Structural issues—Based on changes of one or more sensors—for example, tilted tower, concrete bed structure issues, tower rotations, etc.
  Predictive maintenance/actions
  Predict changes based on weather patterns and previous behavior—for example, for a location with high wind forecast, maintenance can be proactively scheduled.

Some non-limiting examples of the different insights and analysis performed by the examining engine 227 and/or the analytical engine 228 that are possible are further provided. In some examples, learning algorithms or learning systems are employed for the analysis and recommendations. The learning systems can be used to reconfigure the profiles, determine when maintenance is needed, adjust quality, etc. The learning systems can learn from different and multiple data sources, such as a historical data source, for one or more sites and apply the learned patterns to a particular site or sites, such as a similar installation site (e.g., similar soil, similar wind conditions, similar natural disaster, etc.).

Regarding capacity impact, the analysis can recognize that a change in the number of users can be attributed to multiple factors. For example, before a change in a physical parameter there could have been 100 users on an antenna and 80 after a determined change. The examining engine 227 and/or the analytical engine 228 can examine and coordinate data from multiple sources to consider conditions associated with the event. A determination can then be made if at least some of the reduction in users is due to other factors (e.g., users have changed physical location, such as gone to work or moved due to a natural disaster, time of day, and season). Examples of data considered for capacity analysis include composite function of counters depicting capacity, user data, changes in azimuth, changes in tilt, changes in roll, morphology quotient, geographical conditions, and typical number of supported users based on time, day and season of the year. The data can be considered per sector. The employed algorithms for capacity impact can also vary based on geographical conditions and morphology. For example, the equations for dense urban areas can differ from the equations for rural areas.

Regarding coverage impact, the examining engine 227 and/or the analytical engine 228 can consider data, such as from multiple resources, to obtain the location of users with respect to an antenna and determine if coverage has changed based on the locations. For example, has the mechanical tilt changed such that coverage has been reduced. For example, the initial tilt of an antenna was 5 degrees and it was covering up to 5 miles. The tilt was changed, such as due to high winds, to 7 degrees and now it is covering an area of 4 miles with a coverage gap of about 1 mile. The algorithm can predict the change in coverage and the affected area based on the location of users who have coverage. Examples of data considered for coverage impact include composite function of counters depicting coverage, user data, changes in azimuth, changes in tilt, changes in roll, morphology quotient, geographical conditions, and typical radius of supported users based on time, day and season of the year. The data can be considered per sector.

Regarding quality, the examining engine 227 and/or the analytical engine 228 can consider data, such as from multiple sources, to provide an additional understanding of the service quality. For example, instead of merely considering the number of calls that are dropped, the percentage of calls that are dropped, the total number of calls, and the location of calls dropped can also be examined. For example, the number or percentage of calls that are dropped could be due to a football game, concert, or another event in the area of the antenna that brings in a higher number of users for the antenna. Additionally, whose calls are being dropped can be considered. For example, if 10 calls are dropped and a determination is made that 6 of the dropped calls are from the same telephone, then the telephone could be bad. Furthermore, a change in the tilt of antenna may have resulted in a higher number of dropped calls for a sector. The examining engine 227 and/or the analytical engine 228 can consider these factors when analyzing the quality. Examples of data considered for quality impact include composite function of counters depicting quality, RF data from monitoring device, user data, changes in azimuth, changes in tilt, changes in roll, morphology quotient, geographical conditions, and typical quality assessment based on time, day and season of the year. The data can be considered per sector.

For the physical health of the communications structure, the positional data (or one of the positional data) can indicate a changing condition of the structure itself. As such, merely adjusting the antenna mounting will not address the problem. For example, changes of the mechanical tilt can be due to changes of the foundation of the communications structure. The mechanical tilt changes can be seen in each of the antennas in different directions. The foundation changes can be sudden, such as due to an earthquake, flooding, vehicle wreck, or can occur over a longer period of time, such as due to soil settling. The examining engine 227 and/or the analytical engine 228 can consider data, such as from multiple sources, to find the root cause of the problem. This allows dispatching the proper crews to fix the real problem; sending out a foundation crew instead of a climbing crew to adjust the alignment of an antenna.

Figure 4:
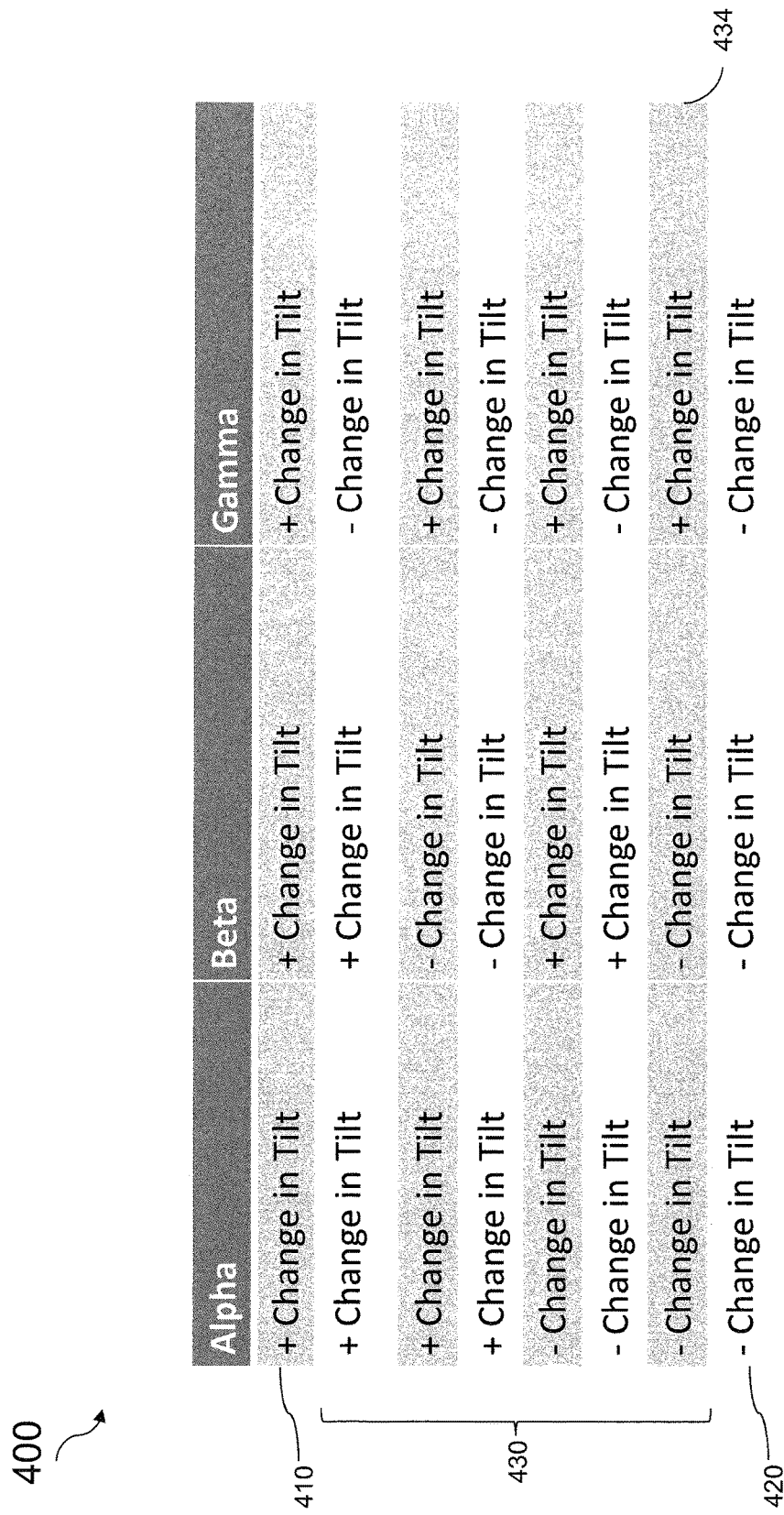
FIG. 4 illustrates a Table that includes an example of different scenarios used for structural analysis carried out according to the principles of the disclosure.

FIG. 4 illustrates a Table 400 that includes an example of different scenarios used for structural analysis carried out according to the principles of the disclosure. The structural analysis can determine if there are issues with the communications structure itself or if there are foundation issues. The Table 400 provides different scenarios that could occur based on tilt measurements obtained by different monitoring devices on three different mounted antennas, such as antennas 120, 122, 124, of FIG. 1. The antennas correspond to sectors that are denoted as Alpha, Beta, and Gamma in FIG. 4. The Table 400 does not include the actual measurements but indicates a plus or minus change in mechanical tilt. A + change indicates a downtilt and a − change indicates an uptilt. For example, a downtilt would occur when the initial tilt is 8 degrees, and new tilt is 10 degrees. An uptilt would occur when the initial tilt is 6 degrees, and the new tilt is 4 degrees.

The examining engine 227 can examine the tilt measurements from the antenna data and the analytical engine 228 can compare the measurements to different scenarios to determine if there is a structural problem. By analyzing multiple measurements and/or data together, a structural problem may be detected instead of an antenna tilt problem. In this example, scenarios 410 and 420 may not indicate a structural problem but could indicate a sensor problem with at least one of the monitoring devices. The other scenarios, collectively referred to as scenarios 430, can indicate the structure itself is leaning in a particular direction. For example, in scenario 434 the communications structure on which the antennas are mounted can be leaning towards the Gamma sector.

For additional structural consideration, FIG. 5 illustrates a Table 500 that includes antenna data from the three antennas of the Alpha, Beta, and Gamma sectors that can be analyzed according to the principles disclosed herein. The Table 500 includes azimuth and tilt measurements with the tilt measurements including initial tilt (or previous tilt) and final tilt (or existing tilt). In one example, the data of Table 500 can be analyzed employing an algorithm represented by Equation 1 to determine possible foundation problems. Equation 1: $\{Azimuth(Alpha)*\Delta tilt*K1\}+\{Azimuth(Beta)*\Delta tilt*K2\}+Azimuth(Gamma)*\Delta tilt*K3\}/$Total change in tilt=Direction in which tower is tilted.

Here K1, K2, and K3, are sector specific quotients for Alpha, Beta, and Gamma, respectively, based on geographical conditions and structural factors. In this example, K1=1, K2=1, and K3=0, and the change in tilt ($\Delta$tilt) for Alpha, Beta, and Gamma, are −, −, and +, respectively. Using Equation 1, and these values a determination can be made that the tower bed for communications structure in which the antennas are mounted is not only leaning but that the direction in which it is tilted at 100 degrees. The 100 degrees represents an azimuthal direction of 100 degrees from north. Accordingly, a foundation crew could be dispatched instead of a climbing crew.

Structural analysis can also be performed using other data such as azimuth measurements. When there are changes in azimuth measurements for more than one sector, there might be a structural issue with the site. For example, in cases where all three antennas show a change in azimuth of about 3 degrees, there might be a change in the communications structure due to maintenance activities or natural conditions. This requires a site maintenance crew to go out to the site and inspect for any damage or changes to the site. As shown in the above example, the SBMS 200 can provide analysis that suggests problems and causes of those problems instead of merely reporting measurements. The examining engine 227 and/or the analytical engine 228 can perform the analysis of data from multiple data sources and elements to confirm or modify the suggested problems or causes.

For predictive maintenance issues, the examining engine 227 and/or the analytical engine 228 can examine historical data to determine if maintenance can be performed before service is affected. For example, historical data can indicate that alignment adjustments are performed at a certain time every year in some locations due to the weather or other issues. Service crews can be instructed to make alignment changes based on the historical data before service is affected. This can be especially beneficial if crews are already in the area. Thus, coordination with crew scheduling is also possible.

The visualization engine 229 provides the visual interface 230 representing the data, the data analysis, the generated actions, etc. The visual interface 230 can be in various formats including maps, charts, and tables, such as represented in FIG. 2. The visualization engine 229 can provide the visual interface 230 to a computing device for viewing.

The computing device can interface with the server 220 via a communications network, such as the internet. The computing device can be a desk top computer, a lap top computer, a computing pad, a smart phone, or another type of computing device having a screen for displaying the visual interface 230. The computing device can display the visual interface 230 via a web browser link. As such, a user can access a dashboard/Web GUI with a link via a web browser. A computer application (e.g., an application) can also be downloaded to a computing device for viewing the visual interface 230. For example, an application on a smart phone can be used. The visual interface 230 can be used as a user interface to communicate with the server 220, and to view data, send commands and receive notifications.

FIG. 3 illustrates an example of the various data sources 300 that can provide data to analyze according to the principles of the disclosure. Data from the data sources 300 can be stored in a data storage for processing, such as data storage 221 of FIG. 2. The data sources 300 include design data 310, construction data 320, data from the monitoring devices 330, data from network operations center 340, user information from the network 350, and weather information 360. System data includes the design data 310, construction data 320, data from network operations center 340, user information from the network 350, and the weather information 360 and can be used to collectively refer to these various types of data.

The design data 310 can be for each particular antenna installation and can come from the design engineer. The design data 310 can include network design configurations and can include physical parameters such as sector azimuths, roll, tilt, sector beam widths, sector physical cell IDs, Cell ID of the communications network site, and site location data. The design data 310 represents the installation design, which can differ from how an antenna installation was actually installed. The construction data 320 represents the actual implementation from the field; how the antennas were actually installed.

The monitoring device data 330 is from the monitoring devices at the antenna locations, i.e., antenna data. Data from the NOC 340 includes data from operation support systems (OSS) that comes from the different original equipment manufacturer (OEM) or equipment vendors, such as Ericsson, Nokia, and Samsung. This data can include the number of users, the quality, and the coverage. The user information from the network 350 can come from the different carriers, such as T Mobile and AT&T. This data can be user data and require approval for access. The weather information 360 can come from different weather sources, including national and local weather services.

Figure 6:
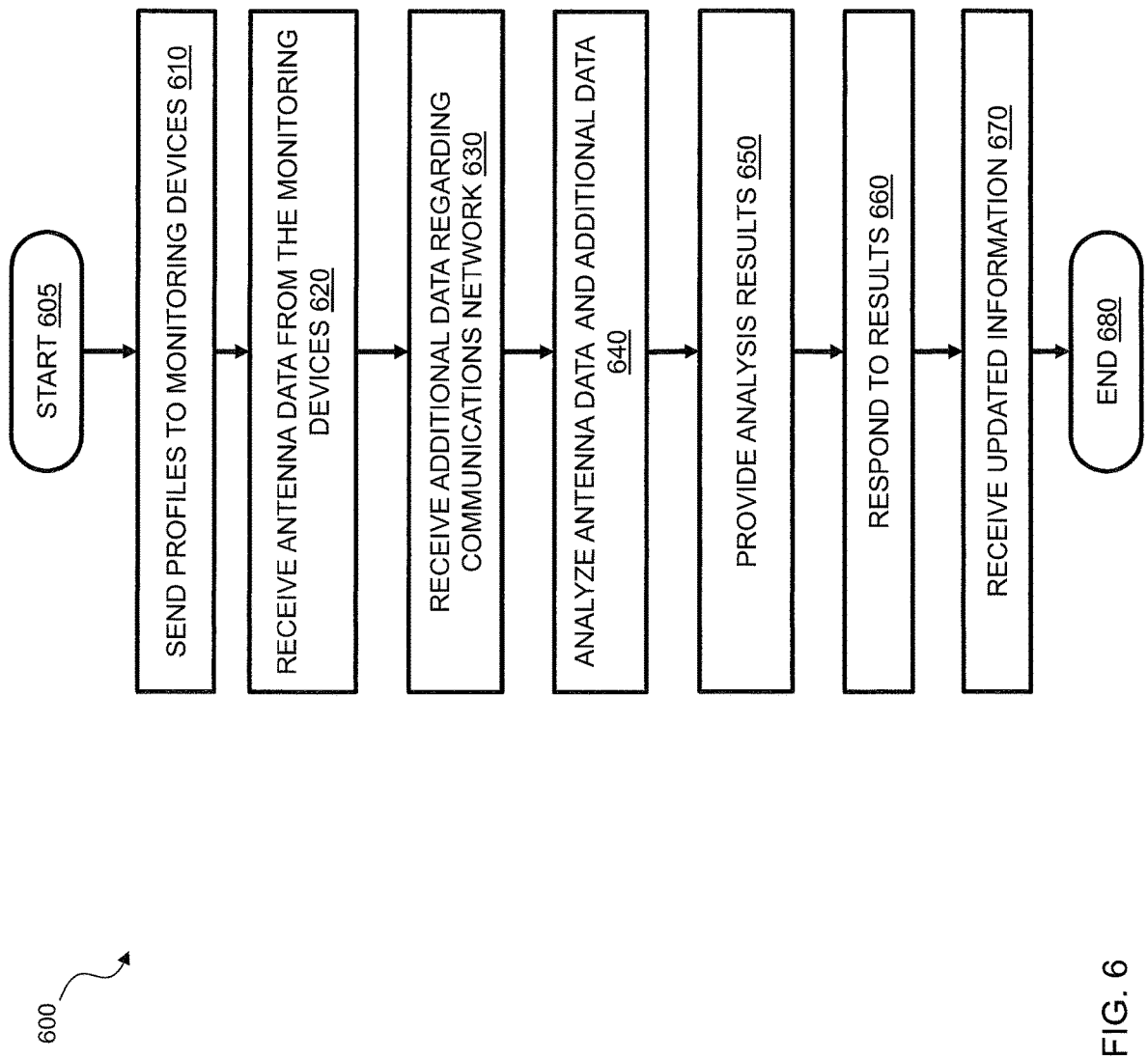
FIG. 6 illustrates a flow diagram of an example of a method of maintaining a wireless communications network carried out according to the principles of the disclosure.

FIG. 6 illustrates a flow diagram of an example of a method 600 of maintaining a wireless communications network carried out according to the principles of the disclosure. The wireless communications network can be a cellular network. At least a portion of the method 600 can be carried out by a SBMS server such as disclosed herein. FIG. 1 illustrates an environment in which the method 600 can operate. Wherein FIG. 1 includes a single site, the method 600 can also operate in an environment with multiple sites. The method 600 begins in a step 605.

In a step 610, profiles are sent to monitoring devices. The profiles can include the data type (or types) and measurement conditions for the monitoring devices. Each of the monitoring devices can have a unique profile. The monitoring devices can be attached to antennas that are mounted on a communications structure at a site. Profiles can be sent during a provision stage such as discussed in method 700 of FIG. 7.

Antenna data is received from the monitoring devices in a step 620. The antenna data can be obtained from the monitoring devices according to the profiles. In addition to the antenna data, system data is received in a step 630. The system data can be received from various data sources associated with the wireless communications network. FIG. 3 provides an example of the various data sources that can be used. Steps 610, 620, and 630, can be performed by a SBMS server and the received data can be stored in a data storage of the SBMS server.

In a step 640, the antenna data and the additional data are analyzed. As described herein the antenna data and the system data can be correlated and analyzed together. The SBMS server can perform the analysis. The results of the analysis can be provided in a step 650. The analysis results, insights and actionable intelligence, can be provided via a visual interface such as disclosed herein. The SBMS server can provide the visual interface to a computing device or devices for viewing by a user or users.

In a step 660, a response to the results can be initiated. A user can initiate the response based on the results. The response can include sending out crews to a particular site to correct an identified problem. Advantageously, the analysis results can indicate the type of crew or crews that are needed, and can prioritize site visits. In some examples, the SBMS server can be used for initiating a response.

In a step 670, update information is received based on the response to the results. The updated information can include changes made to the mounted antennas, to the communications structure itself, or both. The updated information can be stored in the data storage of the SBMS server. The method 600 continues to step 680 and ends.

Figure 7:
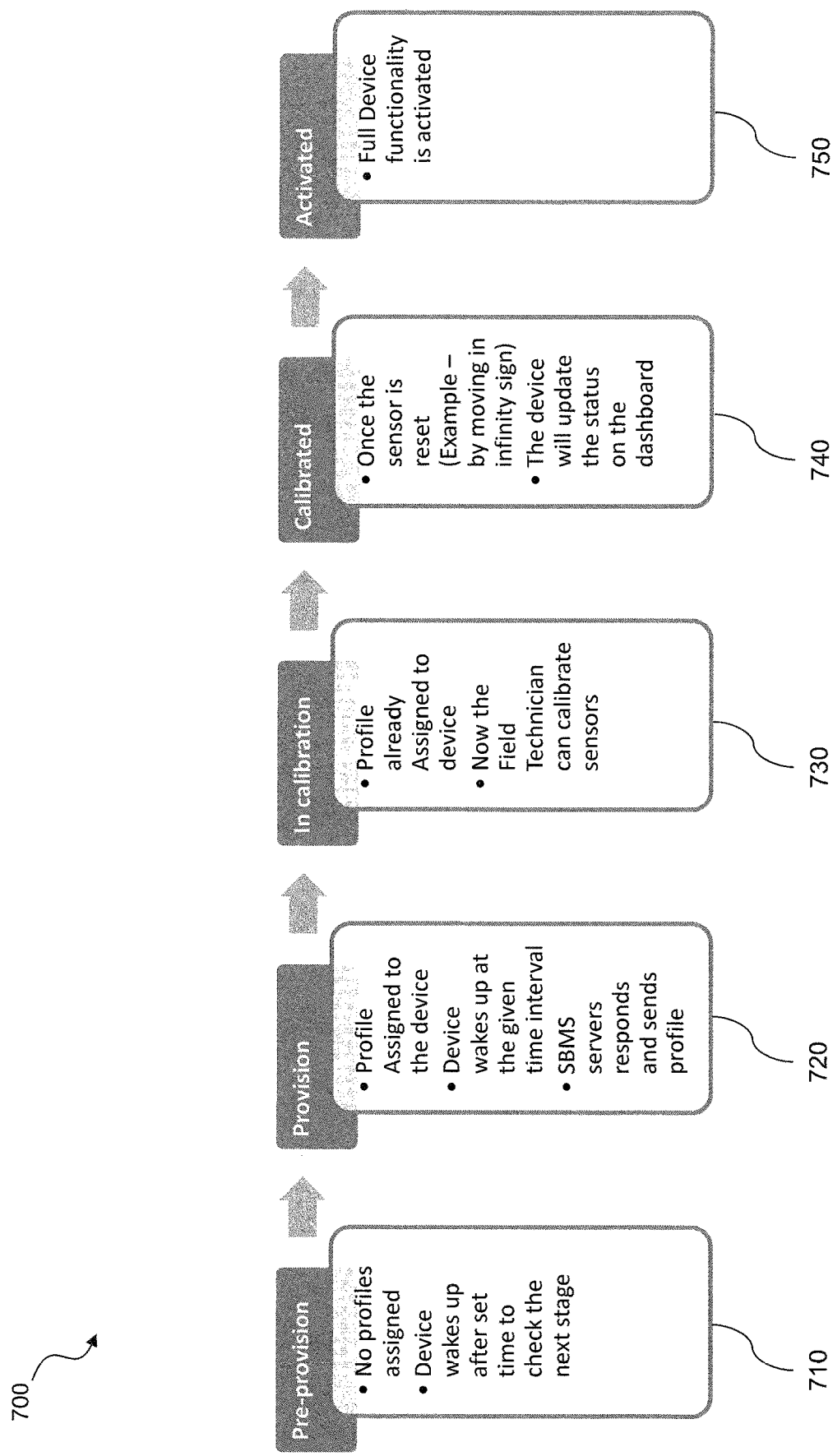
FIG. 7 illustrates a flow diagram of an example of a method of provisioning a monitoring device according to the principles of the disclosure.

FIG. 7 illustrates a flow diagram of an example of a method 700 of provisioning a monitoring device according to the principles of the disclosure. The method 700 relates to preserving battery power for a monitoring device; especially before the monitoring device is installed on an antenna for monitoring. The method 700 corresponds to communications between the monitoring device and a SBMS server. Similar communications can occur simultaneously for multiple monitoring devices with unique profiles being sent to the different monitoring devices. The method 700 begins in a pre-provision step 710.

In the pre-provision step 710, the monitoring device has not received a profile and is configured to wake-up at a set time to check for the next stage of the method 700. The monitoring device can be, for example, stored in a warehouse. To conserve battery power, the pre-provision set time can be set to 24 hours. As such, the monitoring device will wake-up every 24 hours to check with the SBMS server to see if the next stage of method 700 has been asserted. When the next stage, the provision stage, is ready, then the method 700 continues to step 720. If not, the monitoring device remains in the pre-provision stage 710 and goes back to sleep for another 24 hours. 24 hours is used as an example for a set time. The set time can vary.

At the provision stage 720, the SBMS server assigns a profile to the monitoring device. Once the profile is assigned, the SBMS server responds to the monitoring device at the next time interval the monitoring device wakes-up, i.e., next occurrence of set time period, and sends the profile to the monitoring device.

After the provision stage 720, the method 700 continues to calibration step 730. In calibration step 730, the monitoring device has its profile and a field technician at the site has the monitoring device. At this point the field technician is ready to calibrate the sensors of the monitoring device, such as the sensor or sensors for azimuth, mechanical tilt, and roll. The field technician can communicate with a user, such as someone at the SBMS server or who has access to a visual interface, to receive an acknowledgment of calibration mode.

In step 740 the monitoring device is calibrated. In this step 740, the sensors are reset via moving the monitoring device in a FIG. 8 or infinity sign. The monitoring device is then positioned with an antenna on the communications structure. The field technician may communicate with a user at a monitoring center while on the communications structure to verify calibration and communication with the SBMS server. The user may be user a visual interface to check for calibration and communication.

After the monitoring device is calibrated in step 740, the device is then activated in step 750. At this point, the monitoring device is fully activated and operating according to the profile it received.

The SBMS provides several advantages for maintaining connectivity. The advantages include:
- The system provides more insights on current and probable impacts of the changes in an antenna's physical parameter changes (such as mechanical tilt, roll, and azimuth).
- The system can help prioritize the sites with maximum user impact.
- The system can help with proactive maintenance scheduling.
- The system can determine structural issues with communications structures.

The SBMS provides a solution for network improvement. The physical changes on the antenna parameters can impact thousands of users, if any changes on the antennas can be scheduled proactively, the SBMS can help prioritize the maintenance and reduce the impact on the customers. For example, in the case of natural disasters, the sites with highest impact in terms of physical changes and end user impact can be prioritized. This method can help operators get network back faster and in a more efficient way. The SBMS can also help with product installation services and for providing corrective measures suggested by the system for field services.

While the methods disclosed herein have been described and shown with reference to particular steps performed in a particular order, it will be understood that these steps may be combined, subdivided, or reordered to form an equivalent method without departing from the teachings of the present disclosure. Accordingly, unless specifically indicated herein, the order or the grouping of the steps is not a limitation of the present disclosure.

The above-described systems and methods or at least a portion thereof may be embodied in or performed by various processors, such as digital data processors or computers, wherein the computers are programmed or store executable programs or sequences of software instructions to perform one or more of the steps of the methods. The processors can be GPUs, CPUs, or a combination thereof. Servers, such as cloud servers, can be used for at least some of the processing. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods or functions of the system described herein.

Certain embodiments disclosed herein may further relate to computer storage products with a non-transitory computer-readable medium that have program code thereon for performing various computer-implemented operations that embody at least part of the apparatuses, the systems or carry out or direct at least some of the steps of the methods set forth herein. Non-transitory medium used herein refers to all computer-readable media except for transitory, propagating signals. Examples of non-transitory computer-readable medium include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

Those skilled in the art to which this application relates will appreciate that other and further additions, deletions, substitutions and modifications may be made to the described embodiments.

What is claimed is:

1. A sensor based monitoring system (SBMS) for a cellular network, comprising:
   a monitoring device configured to collect different data types of antenna data of an antenna mounted on a communications structure of a cellular network, wherein the monitoring device includes cellular connectivity circuitry configured to transmit the antenna data over the cellular network, and the different data types of the antenna data include one or more of a physical parameter of the antenna, one or more of a RF parameter of the antenna, and one or more of location data associated with the antenna; and
   a SBMS server configured to provide actionable intelligence by correlating the antenna data with system data of the cellular network from other data sources different than the monitoring device, and analyzing the antenna data and the system data together, wherein the monitoring device is configured to collect and transmit the antenna data based on a profile received from the SBMS server and the profile includes a corresponding measurement condition and set time paired with each of the different data types for obtaining a measurement of the different data types, wherein the actionable intelligence includes working on a foundation of the communications structure, performing predictive maintenance at the communications structure, or a combination thereof.

2. The sensor based monitoring system as recited in claim 1, wherein the other data sources are selected from the list of data sources consisting of:
   design data,
   construction data
   network operations center data,
   network user data, and
   weather data.

3. The sensor based monitoring system as recited in claim 1, wherein the SBMS server is configured to analyze the antenna data and the system data to determine at least one of a capacity impact, a coverage impact, or a quality impact, wherein the actionable intelligence is based on the capacity impact, the coverage impact, the quality impact, or a combination thereof.

4. The sensor based monitoring system as recited in claim 1, wherein the SBMS server is configured to analyze the antenna data and the system data to determine a health of the communications structure, and the actionable intelligence is based on the health of the communications structure.

5. The sensor based monitoring system as recited in claim 1, wherein the SBMS server is configured to analyze the antenna data and the system data to determine the predicted maintenance.

6. The sensor based monitoring system as recited in claim 1, wherein the SBMS server is further configured to generate a visual interface based on the antenna data, the system data, an analysis of the antenna data and the system data, the actionable intelligence, or a combination thereof.

7. The sensor based monitoring system as recited in claim 1, wherein the SBMS server includes data storage for storing the antenna data and the system data, an analytical engine for generating the actionable intelligence, and a visualization engine for generating a visual interface.

8. The sensor based monitoring system as recited in claim 1, wherein the system data includes data from design data, construction data, network operations center data, network user data, and weather information.

9. The sensor based monitoring system as recited in claim 1, wherein at least one of the measurement condition and the set time is adjustable during collection of the antenna data by the monitoring device.

10. The sensor based monitoring system as recited in claim 1, wherein the system data includes network user data.

11. The sensor based monitoring system as recited in claim 10, wherein the system data further includes historical data.

12. A monitoring device for a Sensor Based Monitoring System (SBMS), comprising:
cellular connectivity circuitry configured to send and receive data via a cellular network;
sensing circuitry configured to sense different data types of antenna data of a mounted antenna, wherein the different data types of the antenna data include one or more of a physical parameter of the antenna, one or more of a RF parameter of the antenna, and one or more of location data associated with the antenna; and
a processor configured to direct the sensing circuitry to sense the antenna data according to a profile, and control the cellular connectivity circuitry to send, according to the profile, the antenna data to a SBMS server for providing actionable intelligence, wherein the profile includes a corresponding measurement condition and set time paired with each of the different data types for sensing the different data types, wherein the actionable intelligence includes working on a foundation of a communications structure supporting the mounted antenna, performing predictive maintenance at the communications structure, or a combination thereof.

13. The monitoring device as recited in claim 12 wherein the sensing circuitry further includes a wake-up sensor configured to power-up the monitoring device according to the profile.

14. The monitoring device as recited in claim 12 further comprising a protective case, wherein the cellular connectivity circuitry, the sensing circuitry, and the processor are located within the protective case.

15. The monitoring device as recited in claim 14 further comprising location circuitry, wherein the location circuitry provides the one or more location data according to the profile and is located within the protective case.

16. A Sensor Based Monitoring System (SBMS) server for a cellular network, comprising:
data storage configured to store antenna data collected by monitoring devices from antennas mounted on communications structures of the cellular network and system data of the cellular network from other data sources different than the monitoring devices, wherein the antenna data includes one or more of a physical parameter of the antennas, one or more of a RF parameter of the antennas, and one or more of location data associated with the antennas; and
a processor configured to generate actionable intelligence for one or more of the communications structures based on a correlation and an analysis of the antenna data with the system data, wherein the actionable intelligence is for predicted problems of the one or more of the communications structures and includes working on a foundation of one or more of the communications structures, performing predictive maintenance at one or more of the communications structures, or a combination thereof.

17. The SBMS server as recited in claim 16, wherein the processor is configured to analyze the antenna data and the system data to determine the predicted maintenance.

18. The SBMS server as recited in claim 16, wherein the processor is configured to analyze the antenna data and the system data to determine at least one of a capacity impact, a coverage impact, or a quality impact for one or more of the communications structures, and the actionable intelligence is based on the capacity impact, the coverage impact, the quality impact, or a combination thereof.

19. The SBMS server as recited in claim 16, wherein the processor is configured to analyze the antenna data and the system data to determine a health of one or more of the communications structures, and the actionable intelligence is based on the health of the communications structure.

* * * * *